United States Patent Office 2,991,155
Patented July 4, 1961

2,991,155
PROCESS FOR PRODUCING HIGH GRADE, HIGH PURITY HYDROGEN FLUORIDE
Domenico Zanon and Roberto Trupiano, Milan, Italy, assignors to I.C.P.M. S.p.A. Industrie Chimiche Porto Marghera, Milan, Italy, a company of Italy
No Drawing. Filed Nov. 12, 1959, Ser. No. 852,214
Claims priority, application Italy Nov. 18, 1958
1 Claim. (Cl. 23—153)

It is well known that fluorite, essentially formed by calcium fluoride ($CaF_2$), when subjected to the action of sulphuric acid, gives rise to the evolution of hydrogen fluoride, and calcium sulphate ($CaSO_4$) is left as a residue. The reaction is commercially carried out in big continuous generators, e.g. rotary generators, which may contain heavy bodies (balls, iron scraps, stirring blades and the like) which break the calcium sulphate ($CaSO_4$) as it is formed.

"Acid grade" fluorite is commonly used for the production of HF, and this acid grade fluorite has a high content of $CaF_2$ (about 97%), a low impurity content (impurities are generally formed by oxides, carbonates and metallic sulphides) and a silica content which in general is below 1%.

Silica is a highly undesirable impurity since it reacts with hydrogen fluoride to form $SiF_4$ and thus it absorbs a part of the hydrogen fluoride being produced, whereas the carbonates are subjected to the action of sulphuric acid and increase the consumption of this reagent. The presence of sulphur, moreover, acts in such a way that sulphur deposition is frequently met with in the HF generation and condensation plants.

If impure fluorite is used, it is rather difficult to obtain from the generator a gas such as is necessary to obtain the condensation, without losses, of hydrogen fluoride.

Important quantities of water are also evolved from the reaction of silica and carbonates and these are such as to be added to the water which is nearly unavoidably present in the raw materials.

In order that the major aliquot of water may be eliminated from the system, it would be possible to use, in lieu of sulphuric acid at a concentration ranging from 94% to 95% by weight, sulphur trioxide (also in the form of oleum) in an amount equivalent to the water produced by the reaction of the carbonates and silica.

Thus, the hydrogen fluoride coming from the generator is accompanied, besides by $SiF_4$, $CO_2$, air, $SO_2$, also by water of sulphuric acid: this latter can also be present in the form of fluo-sulphonic acid.

Silicon tetrafluoride, due to its condensation point much lower than that of hydrogen fluoride, should not be condensed together with hydrogen fluoride and should be discharged with the "tail" gases such as $CO_2$, air, etc. When, however, water is present in the hydrogen fluoride being condensed, the $SiF_4$ remains in the hydrogen fluoride in the form of $H_2SiF_6$ (fluosilicic acid) and in the greater amount the higher is the water content of HF. Thus water, in addition to depreciating HF, makes the presence of fluosilicic acid in HF more likely.

It is necessary to remove, from the gases coming from the generator, in the first place the water and then sulphuric acid, in order that a condensate having a high HF content may be obtained. This result is obtained, in the general practice, by cooling the gases to a temperature comprised in the range 20° C.–40° C: more than all, water, sulphuric acid and fluosulphonic acid are condensed, together with an aliquot of hydrofluoric acid the amount of which depends on the constitutional diagram of the system.

The composition of these condensates, which are generally designated as "acid drips" in the technical literature, is widely variable, from the 10% to the 90% by weight of HF, while the $H_2SO_4$ contents may vary from 1% to 50% by weight and the contents of other impurities, such as $H_2SiF_6$ is also variable.

Successively, the "production" HF is condensed in condensers, in general by employing a coolant such as brine at a temperature between −20° C. and +19° C. so as to obtain "commercial" HF.

The condensates, or "acid drips," obtained during the cooling of hydrogen fluoride are treated according to different techniques; in some cases, they are separated from the plant and are utilized separately as hydrogen fluoride solutions.

In other cases, the acid drips are fed back to the generator so as to constitute a sort of closed cycle between the generator and the apparatus connected thereto, such as filters, coolers and the like.

When the fluosulphonic acid content is sufficiently high, the acid drips can be drawn from the installation and put on the market as fluosulphonic acid, or they can be separately treated so as to reconstitute hydrogen fluoride.

Silicon tetrafluoride and carbon dioxide behave as inert gases and can be exhausted from the condenser together with the other vented out gases.

The obtention of pure hydrogen fluoride is facilitated if, for example, silicon tetrafluoride is caused to evolve separately from hydrogen fluoride.

It has thus been suggested in some cases to pre-treat the fluorite either by slurrying it with the same sulphuric acid which is necessary for attaching the fluorite in the generator for the production of HF so as to cause the evolution of the impurities in the gaseous state (e.g. silicon tetrafluoride, carbon dioxide etc.) and separately from the produced HF, thus obtaining that the latter is virtually not contaminated by the former. This practice, however, requires special expedients and apparatus (mixers and kneading machines) capable of giving a homogeneous mixture and of overcoming the resistance of the material which has the tendency to harden as the reaction with sulphuric acid goes on, and thus the evolution of the impurities in the gaseous state is considerably hindered thereby.

The process, the subject of the present invention, permits the production of high grade hydrogen fluoride while employing fluorite of any grade even fluorite having a high content of impurities such as carbonates and silica and, in general having any amount of such impurities.

The hydrogen fluoride which is produced by the process of the present invention is a high grade hydrogen fluoride, that is, a hydrogen fluoride which contains not less than 98.5%–99% by weight of hydrogen fluoride HF, has a low sulphuric acid content (less than 0.1%) and an extremely low contents of fluosilicic acid. The hydrogen fluoride produced according to the method of the present invention has thus such favourable characteristics as to permit it to be directly employed in chemical processes which require an imperatively strict purity.

According to a preferred, but not exclusive, embodiment of the present invention, fluorite—even having a low $CaF_2$ content—undergoes a purification by means of hydrogen fluoride, for example in order to remove carbonates and silica, before being subjected to the direct attack with sulphuric acid. This process is such that silica, for example, is converted into silicon tetrafluoride, gaseous and at high concentration, which can be used for recovering all the fluorine content equivalent to the silica initially present in the fluorite. On the other hand, oxides and carbonates, by their reacting with the purifying hydrogen fluoride solution, are, obviously, converted into the corresponding fluorides and these latter, when subjected to the successive attack by sulphuric acid in the generator, will give back the hydrogen fluoride they have consumed during the purifying process. As regards carbon dioxide, this is evolved in the gaseous state.

The subsequent condensation of a pure hydrogen fluoride is facilitated by the preliminary treatment outlined above which is capable of removing, separately from HF, the major aliquot of the impurities.

By so doing, the drawback, commonly experienced in the conventional processes, of an aliquot of HF being lost together with carbon dioxide and silicon tetrafluoride when these are vented out, is overcome.

An additional advantage afforded by the process of the present invention is that of making it possible to recover the hydrogen fluoride unavoidably entrained by the small quantity of inert gases (such as air, which is always present in the system), by scrubbing the gases exhausted from the condensers with the same sulphuric acid which is used for attacking the fluorite in the generator.

In this case the well known solubility of hydrogen fluoride in sulphuric acid is resorted to and this property can be profited of the better, since the volume of inert gases is kept to a minimum when the process of this invention is adopted. As the quantity of HF in the inert gases is small, the amount of sulphuric acid required for producing hydrogen fluoride is sufficient to dissolve all the hydrogen fluoride. The scrubbing column for washing the tail gases with sulphuric acid is of an easy and convenient construction, since the volumes of the gases to be treated are small, so that the quantity of sulphuric acid is sufficient for recovering from the inert gases all the entrained hydrogen fluoride.

The hydrogen fluoride obtained, according to the present invention, from a fluorite of no matter how high content of impurities, will have a very low impurity content, since the invention provides for eliminating carbonates, oxides and silicon from the fluorite. No technical difficulty is thus outstanding, even when highly impure fluorites, such as those having a high carbonate contents, are employed.

According to a modified embodiment of the present invention the purification of fluorite may take place, totally or in part, at the expenses of the "acid drips" which are obtained by the purification (cooling) of hydrogen fluoride—containing gases.

The chemical characteristics of these acid drips can be adjusted according to necessity by acting on the cooling and on the velocity of the gases, besides on the concentration of sulphuric acid, so that these impurities are caused to contain all the water and the sulphuric acid initially present in the gases coming out of the generators.

According to a basic feature of the present invention, these condensates or "acid drips" are collected in the various points of the installation wherein they are formed during cooling of the gases, are then discharged from the installation. Thus, an additional disposal of impurities is effected, more than all water and sulphuric acid. In addition, since water is disposed of with the condensates, the run of the generating plant is made more convenient, and thus also that of the condensing plant, so that the addition of $SO_3$ (which is generally supplied as oleum) can be dispensed with, thus also minimizing the risk of forming fluosulphonic acid and the attendant contamination of the produced hydrogen fluoride.

The preliminary treatment of fluorite with the acid drips, which are taken out of the plant in several points, where they are formed during cooling the the gases and before condensing the produced hydrogen fluoride, must be adjusted so that no formation of calcium sulphate takes place (this can occur due to the presence of sulphuric acid) in order not to hinder the subsequent feeding of the thusly treated fluorite to the generator.

The preliminary treatment of fluorite is effected with hydrogen fluoride, for example in mixers: the carbonates, oxides, and silica react with hydrogen fluoride. Hydrogen fluoride is fed, in properly adjusted amounts and concentrations, according to this invention, as a function of the impurity content of the fluorite and of the desired degree of purity for the final hydrogen fluoride. For example, stoichiometric quantities can be used or also amounts in a slight excess with respect to the amount of carbonates, oxides and silica initially present in the fluorite.

The mixer can be made in a number of different ways: it can be a screw-mixer, a paddle-mixer (even with variable pitch blades or vanes) so as to bring about in any case a continuous mixing between hydrogen fluoride and fluorite, while keeping the fluorite mass in conditions of sufficiently soft consistency.

Furthermore, the quantity and concentration of hydrogen fluoride must be such that, if a mixer is employed, the fluorite is wetted, but not kneaded, in order that the evolution of impurities in the gaseous state, such as $SiF_4$ and $CO_2$, is in no wise hampered.

As has been pointed out hereinbefore, the condensates coming from the HF generating plant may be used for the treatment, either alone, or with additional HF.

Due to the reaction heat, the mass is spontaneously heated. However, if the content of silica, carbonates, oxides and metal salts present in the original fluorite is low and/or the reaction heat is insufficient to cause the evolution of all the silicon tetrafluoride, the completion of the reactions and the evaporation of water, the mixer can be externally heated, for example at a temperature of 80° C.–150° C. With this procedure, the fluorite, as it comes out of the mixer, is dry and not in lump form.

The preliminary treatment of the fluorite can also be performed in a gaseous suspension reactor with the known procedures of fixed bed fluidization, in one or more stages; and with turbulence and conveyance. In these cases gaseous hydrogen fluoride, directly coming from the generator or from any installation capable of producing HF in the gaseous state, is used, and is introduced in the reactor. The reactor can be heated, for example by introducing in the reactor exhaust gases coming from a burner, either admixed to hydrogen fluoride or separately therefrom, for example fed over the fluidization plate.

The feeding of fluorite and hydrogen fluoride to the mixer or the turbulence reactor is performed continuously and the discharge is also continuous.

The fluorite comes out of the mixer or the reactor having the desired silica content, for example lower than 0.5–1% of $SiO_2$, whereas the metal oxide impurities and the metals present in the original fluorite in the form of salts (e.g. carbonates) are converted, by the treatment with HF, into the corresponding fluorides which, as they are treated with sulphuric acid in the generator, give back the hydrogen fluoride, as has been pointed out hereinbefore.

The impurities evolved by the treatment, $SiF_4$ and $CO_2$, and the water, are exhausted in the gaseous form and these gases may contain a variable amount of silicon tetrafluoride, for example from 20% to 60% by weight.

The fluorite purifying plant may be directly connected to the hydrogen fluoride generating plant, thus forming an integral part thereof, but the purifying plant can also be built as a separate unit and be operated independently thereof. In order to give a clearer picture of the process outlined above, three operative examples of the process are set forth hereinafter. These examples refer to the employment of the acid drips from the HF generating plant and to the preliminary treatment of fluorite until obtaining different degrees of purity so as to give, according to the invention, high grade and high purity hydrogen fluoride.

Example 1

One hundred kilograms of fluorite containing 1% silica and 1% carbonates, are treated with acid drips having the following analytical composition:

$$HF = 70\%;\ H_2O = 29\%;\ H_2SO_4 = 1\%$$

The acid drips are employed in such an amount as to represent the quantity of hydrogen fluoride stoichiometrically equivalent to the silica and carbonates content of the original fluorite, and are mixed with the fluorite for a period of time varying from 30 mins. to 1 hr., at a temperature of about 120° C. In the process there are used, for the decomposition of the carbonates, and for removing silica as silicon tetrafluoride, 2.476 kgs. of acid drips.

If the sulphuric acid present (1 kg. for 100 kgs. of acid drips) is not taken into account, the yield is 80% with respect to silica and the total decomposition of carbonates, according to reactions:

$$SiO_2 + 4HF \rightarrow SiF_4 + 2H_2O$$
$$CaCO_3 + 2HF \rightarrow CaF_2 + H_2O + CO_2$$

There are evolved:

1.56 kgs. $SiF_4$; 0.64 kgs. $CO_2$; 0.133 kgs. HF; 1.438 kgs. $H_2O$. The percentage composition, by volume, of the gases listed above is:

$$SiF_4 = 13.45\%;\ HF = 5.92\%;\ H_2O = 71.66\%;\ CO_2 = 8.97$$

After the treatment, the fluorite does not contain more than 0.1% silica.

Thus, by treating a fluorite having the above noted analysis, and taking out the acid drips from the generating plant, a hydrogen fluoride has been obtained which has a minimum grade of 99% HF and a maximum content of $H_2SO_4$ as low as 0.05%.

Example 2

One hundred kilograms of fluorite having 9% of silica and 5% of carbonates are treated with acid drips of the following analytical composition:

$$HF = 70\%;\ H_2O = 29\%;\ H_2SO_4 = 1\%$$

The acid drips are employed in such an amount as to have the quantity of hydrogen fluoride stoichiometrically equivalent only to 1% of the silica and to 1% of the present carbonates, and are admixed to fluorite for a period of time of 30 mins. to 1 hour, at a temperature of about 120° C.

For the decomposition of the carbonates and for the removal of the silica there are employed in this process 2.476 kgs. of acid drips. If the sulphuric acid present is not taken into account (1 kg. for 100 kgs. of acid drips), there are evolved:

1.56 kgs. $SiF_4$; 0.44 kgs. $CO_2$;
0.133 kgs. HF; 1.438 kgs. $H_2O$

However, after the treatment with the acid drips, the fluorite would have the following composition:

$$91.8\%\ CaF_2;\ 4.09\%\ CaCO_3;\ 4.14\%\ SiO_2$$

The acid drips alone would be insufficient, in this case, to obtain a fluorite having a silica contents lower than 1%, that is, the value defining the "acid grade" fluorite. For this reason 6.8 kgs. of 70% aqueous hydrogen fluoride are added in order to further reduce the contents of impurities and to obtain a high grade hydrogen fluoride.

Example 3

One hundred kilograms of fluoride having 5% carbonates and 5% silica, are treated with 70% aqueous hydrogen fluoride in an amount stoichiometrically equivalent to the silica and carbonates: the mass is heated at a temperature between 10° C. and 120° C. for a period of time of from 30 mins. to 1 hr.

The process requires 12.46 kgs. of 70% aqueous hydrogen fluoride.

There are evolved:

$$H_2O = 9.178\ kgs.;\ SiF_4 = 7.8\ kgs.;$$
$$CO_2 = 2.2\ kgs.;\ HF = 0.672\ kgs.$$

The percentage composition, by volume, of the gases listed above is:

$$H_2O = 76.3\%;\ SiF_4 = 11.21\%;\ CO_2 = 7.48\%;\ HF = 5.02\%$$

The thusly treated fluorite has a silica content not higher than 0.55% and, after the treatment, hydrogen fluoride having a grade not lower than 98.8% will be obtained.

The present invention can be subjected to all those modifications which are within the purview of those skilled in the art, without therefor departing from the spirit or scope of said invention as defined in and by the claim appended to this specification.

We claim:

A process for the production of high grade, high purity hydrogen fluoride comprising the steps of treating raw fluorite with acid drips which are obtained by the cooling of gases containing hydrogen fluoride, water and sulphuric acid from a generating plant where hydrogen fluoride is separately produced and which are capable of causing evolution in the gaseous state and in predetermined degree of the impurities present in the fluorite, and subsequently subjecting the thus treated fluorite to the action of sulphuric acid, the concentration and amount of hydrogen fluoride present in the acid drips being about 70% and being adjusted according to the impurities content of the raw fluorite, said quantity being at least equal to the stoichiometrical equivalent of those impurities, and the treatment of the raw fluorite being effected by mixing the acid drips with the raw fluorite while continuously stirring the fluorite, and externally heating the mixture at a temperatuure of from about 80° C. to 150° C. to supplement the reaction heat when the reaction heat is insufficient to evolve said impurities in the gaseous state.

References Cited in the file of this patent

UNITED STATES PATENTS 2,296,118  Preisman _____ Sept. 15, 1942